United States Patent
Tang et al.

(10) Patent No.: US 9,229,671 B2
(45) Date of Patent: Jan. 5, 2016

(54) METHOD OF EMBEDDING OPTICAL SECURITY FEATURE USING VIRTUAL PRINTER AND SECURITY FEATURE SERVICE

(75) Inventors: Weng Sing Tang, Singapore (SG); Fu Wang Thio, Singapore (SG); Chee Keong Chea, Singapore (SG); Jym Yew Meng Cheong, Singapore (SG)

(73) Assignee: CRIMSONLOGIC PTE LTD, Singapore (SG)

( * ) Notice: Subject to any disclaimer, the term of this patent is extended or adjusted under 35 U.S.C. 154(b) by 1141 days.

(21) Appl. No.: 12/934,770

(22) PCT Filed: Mar. 27, 2009

(86) PCT No.: PCT/SG2009/000105
§ 371 (c)(1),
(2), (4) Date: Sep. 27, 2010

(87) PCT Pub. No.: WO2009/120154
PCT Pub. Date: Oct. 1, 2009

(65) Prior Publication Data
US 2011/0013217 A1    Jan. 20, 2011

(30) Foreign Application Priority Data
Mar. 28, 2008    (SG) ................. 200802457-2

(51) Int. Cl.
G06F 3/12    (2006.01)
H04N 1/00    (2006.01)
H04N 1/32    (2006.01)
B41M 3/14    (2006.01)

(52) U.S. Cl.
CPC ............ *G06F 3/1284* (2013.01); *G06F 3/1222* (2013.01); *G06F 3/1245* (2013.01); *G06F 3/1285* (2013.01); *H04N 1/00244* (2013.01); *H04N 1/32149* (2013.01); *H04N 1/32267* (2013.01); *H04N 1/32325* (2013.01); *B41M 3/14* (2013.01); *H04N 2201/0082* (2013.01); *H04N2201/3205* (2013.01); *H04N 2201/3278* (2013.01)

(58) Field of Classification Search
CPC ... G06F 3/1284; G06F 3/1222; G06F 3/1285; G06F 3/1245; H04N 1/32149; H04N 1/00244; H04N 1/32325; H04N 1/32267; H04N 2201/3205; H04N 2201/3278; H04N 2201/0082; B41M 3/14
USPC ........................................ 358/1.14, 1.15, 3.28
See application file for complete search history.

(56) References Cited

U.S. PATENT DOCUMENTS

| | | | |
|---|---|---|---|
| 6,334,721 B1 * | 1/2002 | Horigane | ......... 400/76 |
| 6,899,475 B2 | 5/2005 | Walton | |
| 2004/0008366 A1 * | 1/2004 | Ferlitsch | ...... 358/1.15 |

(Continued)

FOREIGN PATENT DOCUMENTS

| | | |
|---|---|---|
| EP | 01873626 A2 | 1/2008 |
| KR | 10-2002-0013561 A | 7/2002 |
| WO | 2000/72138 A1 | 11/2000 |

OTHER PUBLICATIONS

Naor et al., "Visual Cryptography", Lecture Notes in Computing Science (LNCS), vol. 950, Springer-Verlag, [1995] pp. 1-12.

*Primary Examiner* — Kent Yip
(74) *Attorney, Agent, or Firm* — Westerman, Hattori, Daniels & Adrian, LLP

(57) ABSTRACT

A method for embedding an optical security feature in a digital document with a virtual printer and a security feature service and then sending the digital document to a hardware printer.

26 Claims, 1 Drawing Sheet

(56) References Cited

U.S. PATENT DOCUMENTS

2004/0019635 A1* 1/2004 Lester et al. ................. 709/203
2005/0289446 A1* 12/2005 Moncsko et al. .......... 715/501.1
2006/0165456 A1* 7/2006 Matsunaga et al. ............. 400/62
2007/0024890 A1* 2/2007 Murata ........................ 358/1.14
2007/0086061 A1* 4/2007 Robbins ........................ 358/400
2007/0121144 A1   5/2007 Kato

* cited by examiner

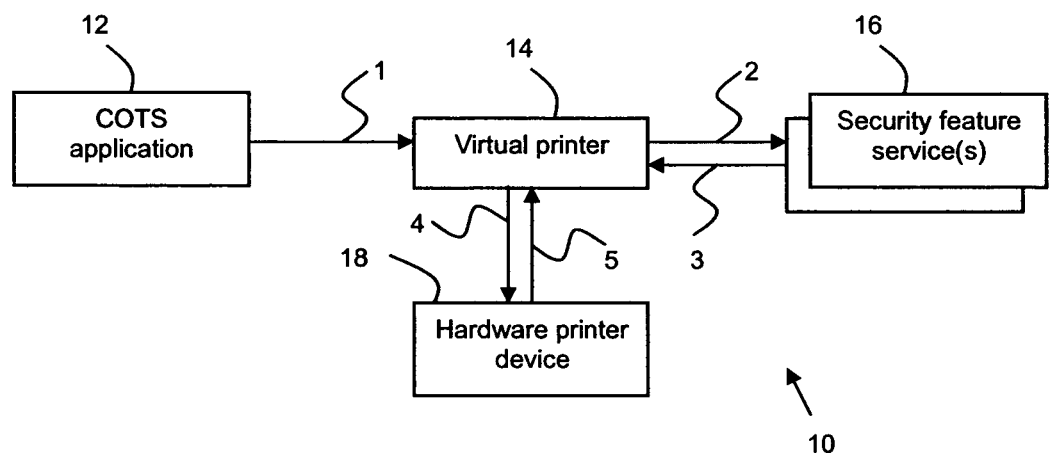

METHOD OF EMBEDDING OPTICAL SECURITY FEATURE USING VIRTUAL PRINTER AND SECURITY FEATURE SERVICE

CROSS-REFERENCE TO RELATED APPLICATIONS

The present patent application is a nationalization of International application No. PCT/SG2009/000105, filed Mar. 27, 2009, published in English, which is based on, and claims priority from, Singapore Application No. 200802457-2, filed Mar. 28, 2008, both of which are incorporated herein by reference in their entireties.

FIELD OF THE INVENTION

The invention relates generally to embedding a security feature into a print job.

BACKGROUND

The current approach to printed document security relies primarily on a customized application that uses an application programming interface (API) provided by a vendor to embed visible and/or invisible optical security features into an intermediate digital data stream and/or file with print data for a document. The processed data stream and/or file is transmitted to a local or networked printer for printing the document.

Due to the need for integration with proprietary APIs into workflows, a digital document generated by a commercial off-the-shelve (COTS) software application, such as a word processor or spreadsheet, cannot be easily embedded with optical security features prior to printing. In addition, a custom application developed on top of a proprietary optical security feature solution coupled at the design level requires implementation changes in the event of migrating to other forms of printed security features.

A COTS application can be customized to incorporate the proprietary API of a selected technology. However, the feasibility of this approach depends on the design of the application and thus may not be an extensible solution. This approach is especially less feasible and more costly in an enterprise setting where multiple productivity applications are used.

Therefore, there is a need to alleviate the problems with embedding an optical security feature into a document to be printed.

SUMMARY

An aspect of the invention is a method of printing that includes providing a print job for a hardware printer, wherein the print job includes print data for printing a document and is in a print format, sending the print job to a virtual printer, reformatting the print job from the print format to an intermediate format using the virtual printer, sending the print job in the intermediate format from the virtual printer to a security feature service, embedding an optical security feature into the print job in the intermediate format using the security feature service, reformatting the print job with the embedded optical security feature from the intermediate format to the print format, sending the print job with the embedded optical security feature from the security feature service to the virtual printer, sending the print job with the embedded optical security feature in the print format from the virtual printer to a hardware printer, and printing the document based on the print job with the embedded optical security feature in the print format using the hardware printer, wherein the printed document includes the print data and the embedded optical security feature.

In an embodiment the embedded optical security feature in the printed document can be visible or invisible. The hardware printer can be a local printer, a remote printer, a dedicated printer or a network printer. Likewise, the hardware printer can be a laser printer or an inkjet printer. The print format can be printer job language, and the intermediate format can be other than printer job language. For instance, the intermediate format can be Postscript or Portable Document Format. The print format can be suitable for the hardware printer and unsuitable for the security feature service, and the intermediate format can be suitable for the security feature service and unsuitable for the hardware printer.

In an embodiment the method can include reformatting the print job with the embedded optical security feature from the intermediate format to the print format using the security feature service, and sending the print job with the embedded optical security feature in the print format from the security feature service to the virtual printer. Alternatively, the method can include sending the print job with the embedded optical security feature in the intermediate format from the security feature service to the virtual printer, and reformatting the print job with the embedded optical security feature from the intermediate format to the print format using the virtual printer.

In an embodiment the method can include sending the print job from the virtual printer to the security feature service and from the security feature service to the virtual printer using a first transmission link, and sending the print job from the virtual printer to the hardware printer using a second transmission link. The first transmission link can use TCP/IP protocol and the second transmission link can use TCP/IP protocol. Likewise, the first transmission link can include the Internet and the second transmission link can not include the Internet. Similarly, the second transmission link can include a USB cable and the first transmission link can not include a USB cable.

In an embodiment the method can include providing the print job using a commercial off-the-shelve software application such as a word processor or spreadsheet that lacks the virtual printer. The method can include embedding the optical security feature into the print job independently of a user that provides the print job, independently of the print data and independently of the hardware printer. The method can exclude printing any print job using the virtual printer, and exclude printing any print job using the hardware printer without using the virtual printer and the selected feature service, thereby preventing printing a document without an embedded optical security feature using the hardware printer.

In an embodiment the method can include providing an operating system, installing a software application in the operating system, installing the virtual printer in the operating system, providing the print job using the software application, sending the print job to the virtual printer using the operating system, sending the print job from the virtual printer to the security feature service using the operating system, sending the print job from the security feature service to the virtual printer using the operating system, and sending the print job from the virtual printer to the hardware printer using the operating system. The operating system can be a desktop operating system such as Windows, Linux or Macintosh.

In an embodiment the method can include providing a network that includes network printers, wherein the network printers include the hardware printer, identifying available printers from the network printers, selecting the hardware printer from the available printers, and providing the print job for the hardware printer in response to selecting the hardware printer.

BRIEF DESCRIPTION OF THE DRAWINGS

In order that embodiments of the invention may be fully and more clearly understood by way of non-limitative examples, the following description is taken in conjunction with the accompanying drawing in which like reference numerals designate similar or corresponding elements, regions and portions, and in which:

FIG. 1 is a block diagram of an embodiment of the invention.

DETAILED DESCRIPTION

FIG. 1 illustrates an embodiment of the invention 10 that includes a COTS application 12, a virtual printer 14, a security feature service 16 and a hardware printer 18. The COTS application will print a digital document of interest using the virtual printer installed in desktop operating system (OS) such as Microsoft Windows, Linux and Macintosh. MICROSOFT and WINDOWS are trademarks of Microsoft Corporation of Washington, United States of America. LINUX is a trademark of Linus Torvalds. MACINTOSH is a trademark of Apple Inc. of California, United States of America. An OS with a printer subsystem that communicates with a hardware printer via a software driver provided by the hardware printer vendor will benefit from the invention because the printer subsystem typically supports a virtual printer. The virtual printer handles all incoming data streams submitted to the virtual printer by any COTS applications that support printing (stage 1). In addition, the OS has access control mechanisms can be configured to ensure that users can only print via the sanctioned virtual printer and not to any other printers in the OS running the COTS application.

The virtual printer communicates with one or more security feature services by formatting the incoming data stream from the COTS application into a suitable intermediate format such as Postscript or Portable Document Format that can be processed by the selected security feature service (stage 2). POSTSCRIPT is a trademark of Adobe Systems Incorporated of California, United States of America. The data stream in the intermediate format is communicated to the security feature service by the relevant proprietary API. The data stream may be communicated to the security feature service via a network protocol such as Secure Socket Layer/Transport Layer Security or other inter-process mechanisms.

The security feature service processes the intermediate data stream from the virtual printer by adding visible and/or invisible optical security feature or features onto the pages represented in the data stream. Typically, the processed data stream is in a format that is readily printable by the hardware printer that could be based on laser or inkjet technologies. This processed data stream is transmitted from the security feature service back to the virtual printer (stage 3).

The virtual printer upon receiving the processed data stream will then redirect the data stream to the actual pre-configured hardware printer for printing (stage 4). The OS access control mechanism is configured to permit only print jobs that are initiated from the virtual printer to the designated hardware printer. The hardware printer may be a local or networked device that communicates bi-directionally with the printing subsystem of the OS. The virtual printer uses the OS standard printing API to submit the processed data stream as a print job to the hardware printer via the printing subsystem.

The hardware printer has bi-directional communication with the OS printing subsystem. As a result, the virtual printer performs administrative and/or auditing tasks, for example to update an audit trail upon a response from the hardware printer (stage 5).

The security feature service can process the data stream in both intermediate format and printer format, depending on the destination hardware printer's capabilities. The processing format is configured by means of the configuration of the security feature service. The security features are typically represented in the same format as the incoming data stream and injected appropriately at different points of the data stream. The security features can be of static or dynamic in nature. By static, it is understood that the feature is independent of dynamic information. An example of static feature would be a visible watermark that represents a static corporate logo. Dynamic security features are generated during run-time and relies on information that can change with different print jobs. An example of a dynamic security feature is when after a user initiates a print job, the user's unique account name is transmitted along with the data stream from the virtual printer to the security feature service.

It will be appreciated that embodiments of the invention may provide that any COTS application that supports printing uses one or more security feature services for embedding one or more visible or invisible optical security features into the print job. Applications are loosely coupled with the security feature services and can migrate or adopt new technologies without further customizations to their COTS or custom applications. Access control of printing resources can be more effectively managed using the invention.

While embodiments of the invention have been described and illustrated, it will be understood by those skilled in the technology concerned that many variations or modifications in details of design or construction may be made without departing from the present invention.

The invention claimed is:
1. A method of printing, comprising:
providing a print job for a hardware printer, wherein the print job includes print data for printing a document and is in a print format;
sending the print job to a virtual printer;
reformatting the print job from the print format to an intermediate format using the virtual printer;
sending the print job in the intermediate format from the virtual printer to a security feature service provided as a separate application from the virtual printer and installed on a different machine than the virtual printer, via a network protocol;
using the security service feature to dynamically generate an optical security feature during run-time and to embed the optical security feature into the print job in the intermediate format independently of a user that provides the print job;
reformatting the print job with the embedded optical security feature from the intermediate format to the print format;
sending the print job with the embedded optical security feature from the security feature service to the virtual printer via the network protocol;
sending the print job with the embedded optical security feature in the print format from the virtual printer to a hardware printer; and printing the document based on the print job with the embedded optical security feature in the print format using the hardware printer, wherein the printed document includes the print data and the embedded optical security feature.

2. The method of claim 1, wherein the embedded optical security feature in the printed document is visible.

3. The method of claim 1, wherein the embedded optical security feature in the printed document is invisible.

4. The method of claim 1
wherein the print format is printer job language, and the intermediate format is not printer job language.

5. The method of claim 4, wherein the intermediate format is Postscript.

6. The method of claim 4, wherein the intermediate format is Portable Document Format.

7. The method of claim 1, wherein the print format is suitable for the hardware printer and unsuitable for the security feature service, and the intermediate format is suitable for the security feature service and unsuitable for the hardware printer.

8. The method of claim 7, wherein the hardware printer is a laser printer.

9. The method of claim 7, wherein the hardware printer is an inkjet printer.

10. The method of claim 1, further comprising:
reformatting the print job with the embedded optical security feature from the intermediate format to the print format using the security feature service; and
sending the print job with the embedded optical security feature in the print format from the security feature service to the virtual printer.

11. The method of claim 1, further comprising:
sending the print job with the embedded optical security feature in the intermediate format from the security feature service to the virtual printer; and
reformatting the print job with the embedded optical security feature from the intermediate format to the print format using the virtual printer.

12. The method of claim 1, further comprising providing the print job using a commercial off-the-shelve software application that lacks the virtual printer.

13. The method of claim 12, wherein the software application is a word processor.

14. The method of claim 12, wherein the software application is a spreadsheet.

15. The method of claim 1, further comprising embedding the optical security feature into the print job independently of the print data.

16. The method of claim 1, further comprising embedding the optical security feature into the print job independently of the hardware printer.

17. The method of claim 1, further comprising excluding printing any print job using the virtual printer.

18. The method of claim 1, further comprising, excluding printing any print job using the hardware printer without using the virtual printer and the selected feature service, thereby preventing printing a document without an embedded optical security feature using the hardware printer.

19. The method of claim 1, further comprising:
providing an operating system;
installing a software application in the operating system;
installing the virtual printer in the operating system;
providing the print job using the software application;
sending the print job to the virtual printer using the operating system;
sending the print job from the virtual printer to the security feature service using the operating system;
sending the print job from the security feature service to the virtual printer using the operating system; and
sending the print job from the virtual printer to the hardware printer using the operating system.

20. The method of claim 19, wherein the operating system is a desktop operating system.

21. The method of claim 20, wherein the operating system is WINDOWS.

22. The method of claim 20, wherein the operating system is LINUX.

23. The method of claim 20, wherein the operating system is MACINTOSH.

24. The method of claim 1, further comprising:
providing a network that includes network printers, wherein the network printers include the hardware printer;
identifying available printers from the network printers;
selecting the hardware printer from the available printers; and
providing the print job for the hardware printer in response to selecting the hardware printer.

25. A method of printing, comprising:
providing a print job for a hardware printer in response to a user interfacing with a software application, wherein the print job includes print data for printing a document and is in a print format; then
sending the print job to a virtual printer; then
reformatting the print job from the print format to an intermediate format using the virtual printer; then
sending the print job in the intermediate format from the virtual printer to a security feature service provided as a separate application from the virtual printer and installed on a different machine than the virtual printer, via a network protocol; then
using the security service feature to dynamically generate an optical security feature during run-time and to embed the optical security feature into the print job in the intermediate format independently of the user that provides the print job, wherein the intermediate format is suitable for the security feature service and the print format is unsuitable for the security feature service;
reformatting the print job with the embedded optical security feature from the intermediate format to the print format;
sending the print job with the embedded optical security feature from the security feature service to the virtual printer via the network protocol; then
sending the print job with the embedded optical security feature in the print format from the virtual printer to a hardware printer; and then
printing the document based on the print job with the embedded optical security feature in the print format using the hardware printer, wherein the printed document includes the print data and the embedded optical security feature, the print format is suitable for the hardware printer and the intermediate format is unsuitable for the hardware printer.

26. The method of claim 25, including embedding the optical security feature into the print job independently of the print data and the hardware printer.

* * * * *